(12) United States Patent
Morishima et al.

(10) Patent No.: US 8,515,090 B2
(45) Date of Patent: Aug. 20, 2013

(54) AMBIENT NOISE REMOVAL DEVICE

(75) Inventors: Morito Morishima, Fukuroi (JP);
Takashi Norimatsu, Hamamatsu (JP)

(73) Assignee: Yamaha Corporation (JP)

( * ) Notice: Subject to any disclaimer, the term of this patent is extended or adjusted under 35 U.S.C. 154(b) by 238 days.

(21) Appl. No.: 12/823,363

(22) Filed: Jun. 25, 2010

(65) Prior Publication Data

US 2011/0002476 A1 Jan. 6, 2011

(30) Foreign Application Priority Data

Jul. 1, 2009 (JP) ................................. 2009-156589

(51) Int. Cl.
*H04R 29/00* (2006.01)
*H04R 1/10* (2006.01)
*H04B 15/00* (2006.01)

(52) U.S. Cl.
USPC ................ 381/71.6; 381/58; 381/59; 381/74; 381/94.1

(58) Field of Classification Search
USPC .............. 381/74, 56, 58, 59, 71.6, 94.1, 71.1, 381/123, 71.2, 71.7
See application file for complete search history.

(56) References Cited

U.S. PATENT DOCUMENTS 3,889,060 A * 6/1975 Goto et al. ...................... 381/96
4,969,195 A * 11/1990 Noro ............................... 381/96

FOREIGN PATENT DOCUMENTS

| JP | 2-250596 A | 10/1990 |
|---|---|---|
| JP | 2822224 B2 | 11/1998 |
| JP | 2001218292 A | 8/2001 |
| JP | 2007-028354 A | 2/2007 |
| JP | 2008294803 A | 12/2008 |

OTHER PUBLICATIONS

Japanese Office Action cited in Japanese counterpart application No. JP2009-156589, dated May 7, 2013. English translation provided.

* cited by examiner

*Primary Examiner* — Vivian Chin
*Assistant Examiner* — Douglas Suthers
(74) *Attorney, Agent, or Firm* — Rossi, Kimms & McDowell LLP

(57) ABSTRACT

An ambient noise removal device includes: a sound signal output section that outputs a sound signal to thereby drive a speaker; a noise detection section that detects an electromotive force produced in the speaker by ambient noise; and a noise cancellation section that generates, on the basis of the electromotive force, a signal of an opposite phase from the ambient noise and adds the generated signal to the sound signal to thereby cancel the ambient noise.

4 Claims, 10 Drawing Sheets

AMBIENT NOISE REMOVAL DEVICE

BACKGROUND

The present invention relates to ambient noise removal device for detecting and canceling or removing noise sound around a headphone speaker or the like.

Heretofore, there have been proposed various techniques which, when a sound signal is to be reproductively output via a headphone speaker, reproduce the sound signal after canceling ambient noise (sound) around the speaker. Japanese Patent Application Laid-open Publication No. 2007-28354 (hereinafter referred to as "Patent Literature 1") discloses a technique in accordance with which a microphone for detecting ambient noise sound is provided outside a casing of a headphone and noise sound is canceled by a headphone speaker being driven with a signal of an opposite phase from the noise signal detected by the microphone. Further, Japanese Patent No. 2822224 (hereinafter referred to as "Patent Literature 2") discloses a technique in accordance with which a first microphone for detecting ambient noise sound is provided outside a casing of a headphone and a second microphone for detecting sound in an ear canal is provided inside the headphone so that an optimal noise canceling characteristic can always be obtained even when the way of wearing or attaching the headphone etc. has changed.

However, in cases where a microphone is used to detect ambient noise sound as in the aforementioned conventionally-known techniques, a microphone has to be mounted for each of left and right headphone casings, which would undesirably increase cost and increase the size of the headphone casings. Particularly, with the technique disclosed in Patent Literature 2, two microphones have to be mounted for each of the left and right headphone casings, which tends to difficult to realize if the headphones are small-size headphones, like a canal type.

Further, audio apparatus, such as headphone amplifiers, include an interface (headphone jack) for connection thereto a headphone. Where a sound signal is stereo signals, the interface generally has three terminals, and thus, if the headphone has a microphone mounted thereon, a noise signal detected by the microphone cannot be input to the audio apparatus. Therefore, in cases where a process for removing a noise signal detected by a microphone of a headphone is performed by such an audio apparatus, an ordinary- or conventional-type interface cannot be used as-is, so that it is necessary to provide a dedicated interface or a separate conversion device for converting the conventional-type interface.

SUMMARY OF THE INVENTION

In view of the foregoing, it is an object of the present invention to provide an improved ambient noise removal device which can detect and remove ambient noise sound at reduced cost and without increasing a size of a casing of a speaker.

In order to accomplish the above-mentioned object, the present invention provides an improved ambient noise removal device, which comprises: a sound signal output section that outputs a sound signal to thereby drive a speaker; a noise detection section that detects an electromotive force produced in the speaker by ambient noise; and a noise cancellation section that generates, on the basis of the electromotive force, a signal of an opposite phase from the ambient noise and adds the generated signal to the sound signal to thereby cancel the ambient noise.

The present invention arranged in the aforementioned manner detects the ambient noise of the speaker by detecting the electromotive force produced in the speaker and thereby cancels the ambient noise. Thus, the present invention can reduce the number of a microphone that was heretofore used for canceling ambient noise.

Preferably, the noise detection section includes an equivalent circuit of the speaker, and the noise detection section detects the electromotive force, produced by the ambient noise, by obtaining a difference between a first electromotive force produced in the speaker in response to the sound signal output section driving the speaker on the basis of the sound signal and a second electromotive force produced in the equivalent circuit by inputting the sound signal to the equivalent circuit.

Preferably, at least part of the equivalent circuit comprises a digital filter.

Preferably, the speaker is a headphone speaker, and the ambient noise removal device of the invention further comprises an interface for connection, to the sound signal output section, of the headphone speaker, and an equivalent circuit setting section that sets the equivalent circuit depending on the headphone speaker connected to the interface.

Preferably, the ambient noise removal device of the invention further comprises a speaker characteristic measurement section that measures a characteristic of the headphone connected to the interface, and the equivalent circuit setting section sets the equivalent circuit on the basis of a result of characteristic measurement by the speaker characteristic measurement section.

The present invention arranged in the aforementioned manner detects the ambient noise of the speaker by detecting the electromotive force produced in the speaker by the ambient noise and thereby cancels the ambient noise. Thus, the present invention can eliminate a need for a microphone for detecting ambient noise and thus can avoid cost increase and prevent size increase of a casing of the speaker. Particularly, where the speaker is a headphone speaker, an ordinary- or conventional-type interface can be used as the interface for connecting the headphone to the sound signal output section, and thus, the ambient noise removal device of the present invention can achieve an enhanced convenience.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION

[Fundamental Construction]

Figure 1:
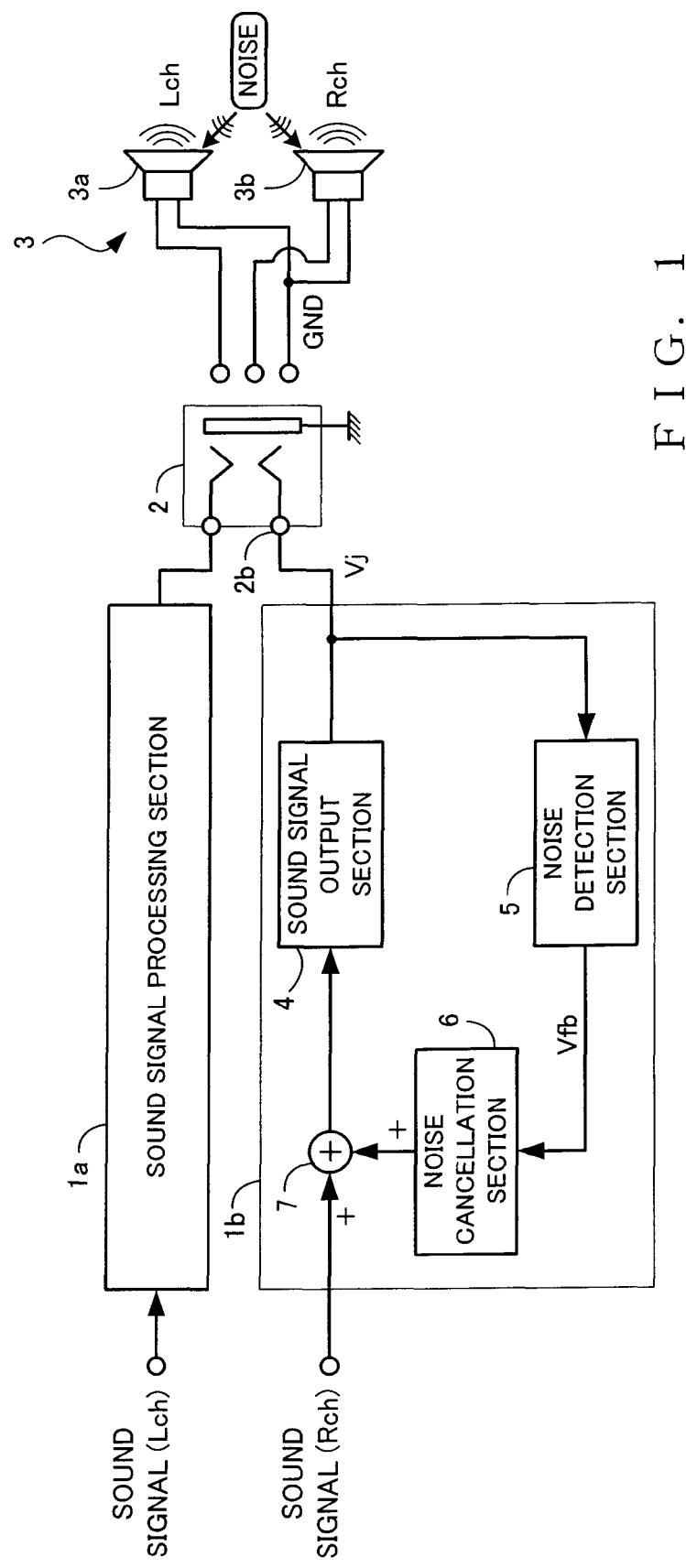
FIG. 1 is a block diagram showing a fundamental construction of an audio apparatus provided with an embodiment of an ambient noise removal device of the present invention.

FIG. 1 is a block diagram showing a fundamental construction of an audio apparatus provided with an embodiment of an ambient noise removal device of the present invention. This audio apparatus is constructed, for example, as a headphone amplifier and includes sound signal processing sections 1a and 1b that receive and process sound signals. In the illustrated example, the sound signals are stereo signals; thus, the sound signal processing section 1a is constructed to process a signal of an L channel (Left channel) while the sound signal processing section 1b is constructed to process a signal of an R channel (Right channel). The audio apparatus also includes, as jacks for connection thereto headphones 3, an ordinary- or conventional-type three-terminal interface 2. The above-mentioned sound signal processing sections 1a and 1b output the processed sound signals to the headphones 3 via the interface 2, to thereby drive left and right speakers 3a and 3b of the headphones 3. Note that the headphones 3 may be small-size headphones of any one of a head band type, inner ear type and canal type.

The sound signal processing sections 1a and 1b are identical in construction and each have a function of outputting a sound signal to a corresponding one of the speakers 3a and 3b and detecting and removing ambient noise sound of the speakers 3a and 3b. Therefore, the following describe the fundamental construction of one of the sound signal processing sections 1b that processes a signal of the R channel, As shown in FIG. 1, the sound signal processing section 1b includes: a sound signal output section 4 that outputs a sound signal to the speaker 3b; a noise detection section 5 that detects ambient noise sound (signal) of the speaker 3b; and a noise cancellation section 6 that generate a noise cancellation signal of an opposite phase from the noise signal to thereby cancel out the detected noise; and an adder 7 that adds the noise cancellation signal to the sound signal.

As the sound signal output section 4 drives the speaker 3b, the speaker 3b audibly outputs the sound. If noise sound exists around the speaker, the noise would enter the speaker 3 to vibrate the speaker 3b, at which time a back electromotive force corresponding to the ambient noise sound is produced in the speaker 3b. The back electromotive force is reflected in a terminal voltage Vj at a jack terminal 2b to which the speaker 3b is connected in the interface 2. The noise detection section 5 detects, from the terminal voltage Vj, only a component of the back electromotive force produced in the speaker 3b (i.e., electromotive force produced under the influence of the ambient noise) and outputs the detected back electromotive force Vfb as a noise signal. Then, on the basis of the noise signal Vfb, the noise cancellation section 6 generates a noise cancellation signal of frequency and phase characteristics, corresponding to those obtained by inverting the phase of the ambient noise around the speaker 3b, in such a manner that a closed loop does not oscillate. Then, the noise cancellation signal is added to the sound signal by the adder 7, and the sound signal output section 4 outputs the sound signal so that the noise sound around the speaker 3 is removed.

The following paragraphs describe more detailed constructions of several embodiments of the sound signal processing section 1b for processing a signal of the R channel; note, however, that the sound signal processing section 1a for processing a signal of the L channel is similar in construction to the sound signal processing section 1b.

[First Embodiment of the Sound Signal Processing Section]

Figure 2:
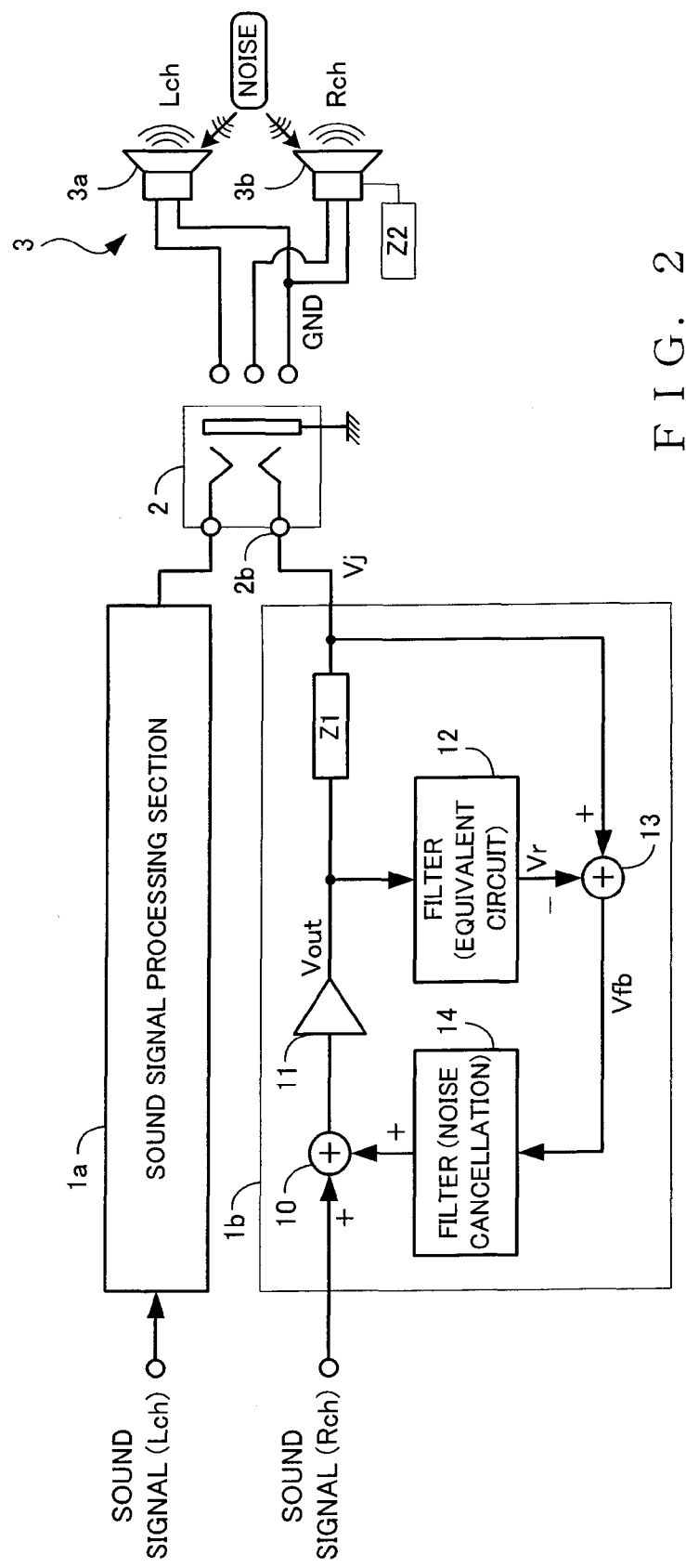
FIG. 2 is a block diagram showing a first embodiment of a sound signal processing section employed in the ambient noise removal device.

FIG. 2 is a block diagram showing the first embodiment of the sound signal processing section 1b. As shown, the sound signal processing section 1b includes adders 10 and 13, an amplifier 11, a predetermined output impedance Z1, and filters 12 and 14 each constructed of an analog circuit. In the sound signal processing section 1b of FIG. 2, a sound signal is input to and amplified by the amplifier 11. The sound signal Vout thus amplified by the amplifier 11 is output through the predetermined output impedance Z1 to thereby drive the speaker 3b.

A voltage Vj at the jack terminal 2b with no noise present around the speaker 3b takes a value corresponding to a voltage divided by the output impedance Z1 and a load impedance Z2 of the speaker 3b, which therefore can be expressed as $$Vj=Vout*Z2/(Z1+Z2)$$

The sound signal processing section 1b of FIG. 2 also includes the filter 12 that is an equivalent circuit of the speaker 3b as viewed from the amplifier 11. The filter 12 has a bandpass characteristic set so as to establish relationship of "Z2/(Z1+Z2)". The sound signal Vout amplified by the amplifier 11 is supplied to the filter 12, so that an output signal Vr is obtained from the filter 12. The output signal Vr can be expressed as $$Vr=Vout*Z2/(Z1+Z2)$$

and thus, it is used as a reference voltage for detecting a noise component contained in the voltage Vj of the jack terminal 2b.

As noted above, if there is noise around the speaker 3b, the noise causes the speaker 3b to produce a back electromotive force, and the thus-produced back electromotive force will fluctuate the voltage Vj of the jack terminal 2b. Thus, in the sound signal processing section 1b, the terminal voltage Vj and the output voltage (reference voltage) Vr are input to the adder 13 to obtain a difference between the terminal voltage Vj and the output voltage (reference voltage) Vr. In this manner, the back electromotive force Vfb produced due to the ambient noise sound around the speaker 3b can be obtained as a noise signal. Namely, this noise signal corresponds to noise sound picked up by the speaker 3b from outside.

The noise signal Vfb is input to the filter 14, which, as noted above, generates a noise cancellation signal of frequency and phase characteristics, corresponding to those obtained by inverting the phase of the noise around the speaker 3b, without oscillation of the closed loop and then outputs the generated noise cancellation signal to the adder 10. The adder 10 adds the noise cancellation signal to the input sound signal, to thereby generate a sound signal having the ambient noise around the speaker 3b removed therefrom. As a result, reproductive sound output is made from the speaker 3b in such a manner as to remove the ambient noise sound.

As set forth above, the first embodiment of the sound signal processing section 1b of FIG. 2 detects ambient noise around the speaker 3b by detecting an electromotive force produced in the speaker 3b due to the ambient noise. Thus, the first embodiment can eliminate a need for (or can dispense with) a microphone that was required in the conventionally-known counterpart for removing ambient noise. Therefore, the first embodiment can not only avoid cost increase due to provision of a microphone but also effectively remove ambient noise sound even where the headphone is of a small size. Further, because the interface 2 for connecting the headphone 3 to the audio signal output section 4 of the audio apparatus can be constructed of a conventional three-terminal interface, it is possible to eliminate a need for a dedicated interface or interface conversion device and thereby achieve a superior convenience.

[Second Embodiment of the Sound Signal Processing Section]

The following describe a second embodiment of the sound signal processing section 1b. In the above-described first embodiment, in which the filter 12 is an equivalent circuit of the speaker 3b as viewed from the amplifier 11 (see FIG. 2), the impedance Z2 of the speaker 3b contains a component of an inductance L, and thus, if an equivalent impedance containing the inductance component L is constructed of an analog circuit, the equivalent circuit may become complicated in construction. Therefore, in the second embodiment of the sound signal processing section 1b, the equivalent circuit including the impedance Z2 of the speaker 3b is constructed using a resistance R and a capacitance C, as detailed below.

Figure 3:
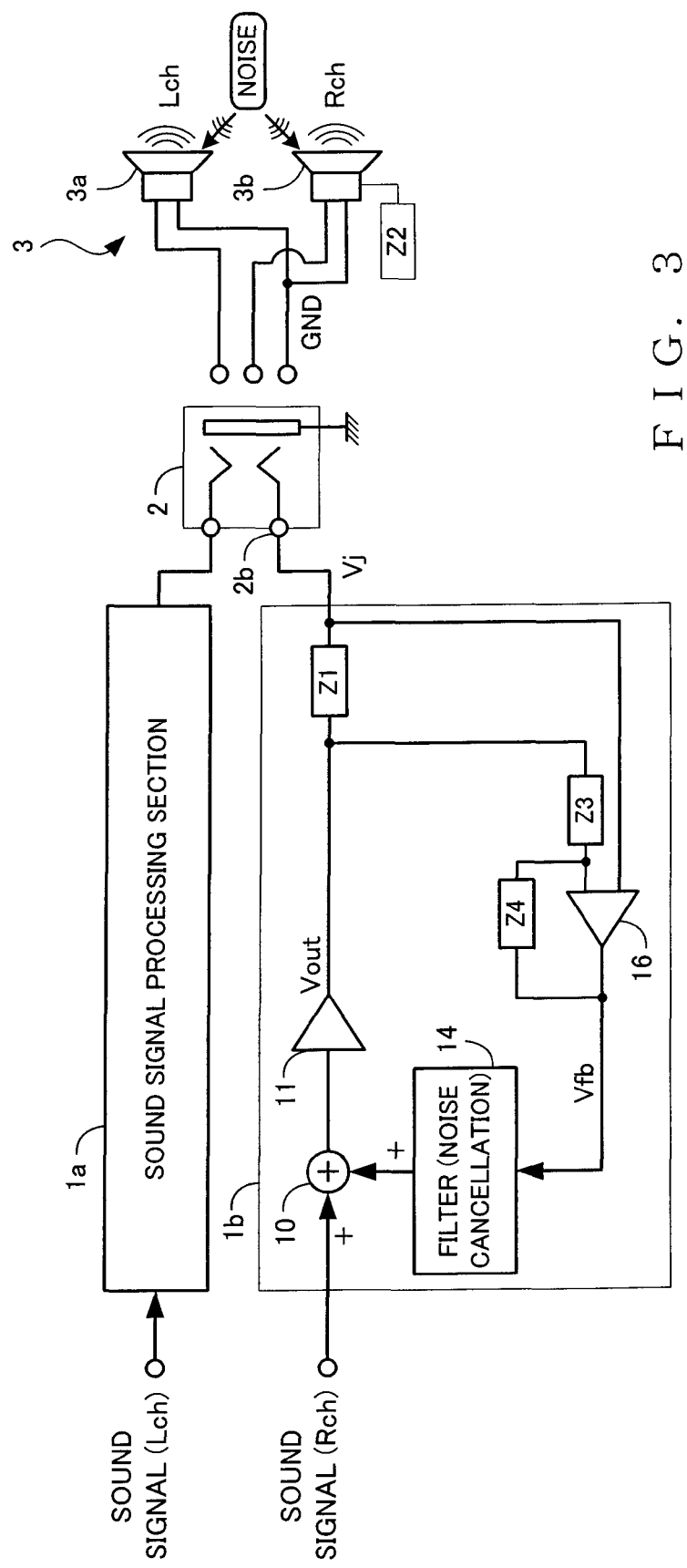
FIG. 3 is a block diagram showing a second embodiment of the sound signal processing section.

FIG. 3 is a block diagram showing the second embodiment of the sound signal processing section 1b. As shown, the sound signal processing section 1b includes an adder 10, an amplifier 11, a predetermined output impedance Z1, and impedances Z3 and Z4 constituting a filter, a differential amplifier 16, and a filter 14. In the second embodiment of the sound signal processing section 1b of FIG. 3, a sound signal Vout amplified by the amplifier 11 is output through the predetermined output impedance Z1 to thereby drive the speaker 3b, as in the above-described first embodiment. The speaker 3b has a load impedance Z2.

Further, in the second embodiment of the sound signal processing section 1b, the equivalent circuit of the speaker 3b as viewed from the amplifier 11 comprises an analog filter comprising the impedances Z3 and Z4 and the differential amplifier 16. The terminal voltage Vj of the jack terminal 2b is input to a non-inverting input terminal of the differential amplifier 16, while the sound signal Vout amplified by the amplifier 11 is input to an inverting input terminal of the differential amplifier 16 through the impedance Z3 Further, a negative feedback is made from an output of the differential amplifier 16 to the adder 10 via the impedance Z4. If the impedances Z3 and Z4 are set to establish relationship of "Z3/Z4=Z1/Z2", a back electromotive force Vfb due to ambient noise sound of the speaker 3b can be obtained as an output of the differential amplifier 16. This back electromotive force Vfb corresponds to noise sound (noise signal) picked up by the speaker 3b from outside.

The noise signal Vfb is input to the filter 14, which, like the above-described filter 14 of the first embodiment, generates a noise cancellation signal and outputs the thus-generated noise cancellation signal to the adder 10. The adder 10 adds the noise cancellation signal to the input sound signal, to thereby generate a sound signal having the ambient noise around the speaker 3b canceled or removed therefrom. As a result, reproductive sound output is made from the speaker 3b in such a manner as to remove the ambient noise sound.

In the second embodiment, as set forth above, the equivalent circuit of the speaker 3b is constructed using the differential amplifier 16, and the impedance Z4 provided on the negative feedback side of the differential amplifier 16 is constructed of the resistance R and capacitance C. Thus, an impedance substantially equivalent to the impedance Z2 including the inductance L of the speaker 3b can be obtained depending on the equivalent circuit. As a result, the second embodiment can relatively simply construct the equivalent circuit of the speaker 3b as viewed from the amplifier 11.

Like the first embodiment, the above-described second embodiment of the sound signal processing section 1b can eliminate a need for a microphone for removing ambient noise. Therefore, the second embodiment can not only avoid cost increase due to provision of a microphone but also effectively remove ambient noise sound even where the headphone is of a small size. Further, the interface 2 for connecting the headphones 3 to the sound signal output section of the audio apparatus can be constructed of a conventional three-terminal interface.

[Third Embodiment of the Sound Signal Processing Section]

The following describe a third embodiment of the sound signal processing section 1b. In the above-described first and second embodiments, the equivalent circuit, including the equivalent impedance of the speaker 3b, comprises an analog filter. By contrast, the third embodiment is characterized in that the equivalent circuit, including the equivalent impedance of the speaker 3b, comprises a digital filter implemented, for example, by a DSP so that the circuit can be constructed more simply and implemented and mounted more easily than the one constructed of an analog filter.

Figure 4:
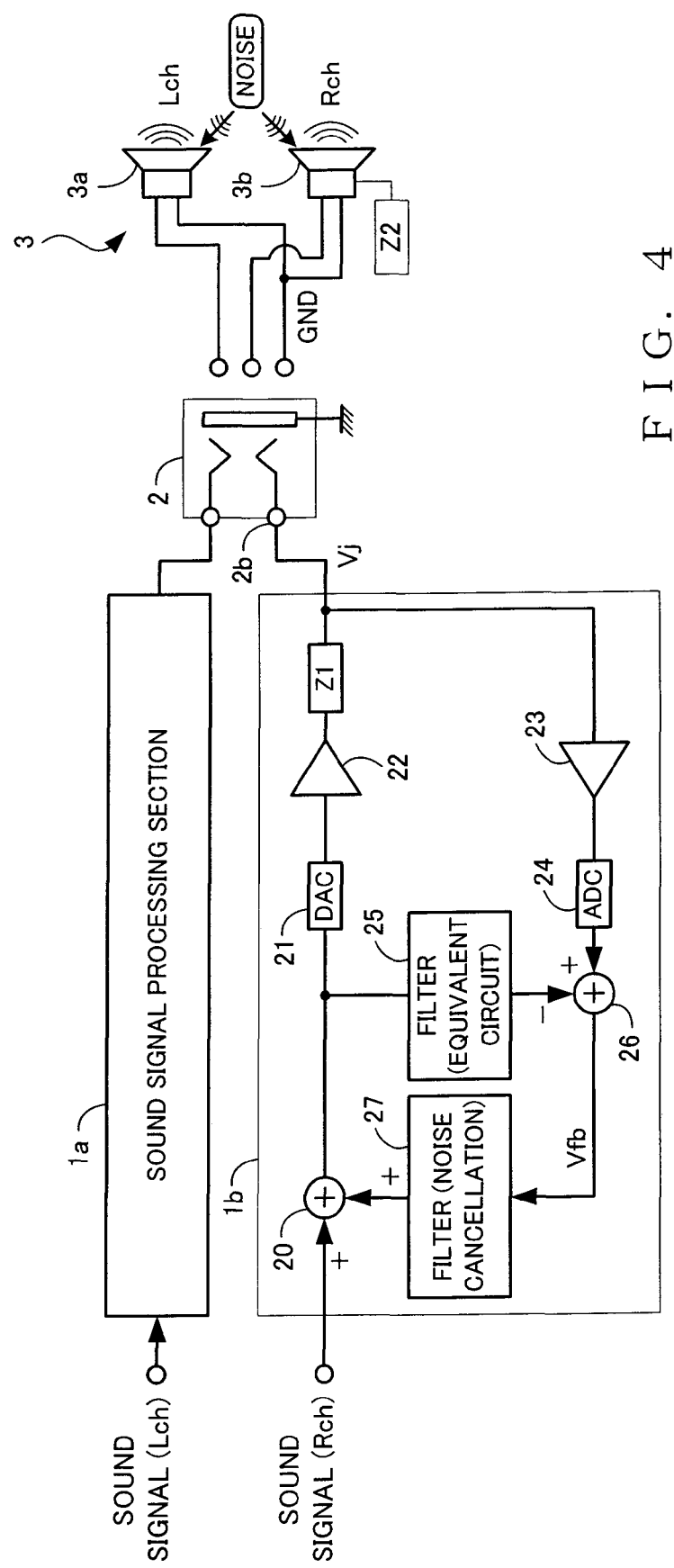
FIG. 4 is a block diagram showing a third embodiment of the sound signal processing section.

FIG. 4 is a block diagram showing the third embodiment of the sound signal processing section 1b. As shown, the sound signal processing section 1b includes adders 20 and 26, a D/A converter 21, amplifiers 22 and 23, a predetermined output impedance Z1, an A/D converter 24, and digital filters 25 and 27. Each sound signal input to the sound signal processing section 1b is a digital sound signal.

In the third embodiment of the sound signal processing section 1b of FIG. 4, an input digital sound signal is converted to an analog signal by the D/A converter 21 and then amplified by the amplifier 22. The sound signal thus amplified by the amplifier 22 is output through the predetermined output impedance Z1 to thereby drive the speaker 3b. Also, a voltage Vj at the jack terminal 2b, in which is contained an electromotive force produced due to ambient noise around the speaker 3b, is amplified by the amplifier 23 and converted into a digital signal by the A/D converter 24.

The filter 25 is a digital filter that implements the above-mentioned equivalent circuit of the analog circuit including the speaker 3b. Namely, in the instant embodiment, various parameters defining a transfer function of the filter 25 are set on the basis of gains of the amplifiers 22 and 23, output impedance Z1 and load impedance Z2 of the speaker 3b. Thus, a signal corresponding to a reference voltage for detecting a noise component contained in the voltage Vj at the jack terminal 2b can be obtained by passing the sound signal through the filter 25.

Further, in the third embodiment of the sound signal processing section 1b, the output signal from the A/D converter 24 and the output signal from the filter 25 are input to the adder 26 to obtain a difference between the output signals, so that a back electromotive force Vfb due to ambient noise sound around the speaker 3b is detected as a noise signal.

The noise signal Vfb is input to the filter 27. The filter 27 is a digital filter which generates a noise cancellation signal of frequency and phase characteristics, corresponding to those obtained by inverting the phase of the ambient noise around the speaker 3b, on the basis of the input noise signal Vfb and then outputs the generated noise cancellation signal to the adder 20. The adder 20 adds the noise cancellation signal to the input sound signal, to thereby generate a sound signal having the ambient noise around the speaker 3b canceled or removed therefrom. As a result, reproductive sound output is made from the speaker 3b in such a manner as to remove the ambient noise sound.

According to the third embodiment, as set forth above, the equivalent circuit including the impedance Z2 of the speaker 3b comprises the digital filter implemented, for example, by a DSP, and thus, the equivalent circuit can be implemented and mounted more easily than the one comprising an analog filter.

Further, the equivalent circuit comprising the digital filter is adjustable more easily than the equivalent circuit comprising the analog filter, and thus, even where a headphone 3 of a different type has been connected to the interface 2, the third embodiment can achieve the advantageous benefit that it is possible to relatively easily implement the equivalent circuit, matched to the impedance Z2 of the speaker 3b, by adjusting various parameters defining the transfer function of the filter 25. In this case, the parameter adjustment may be made either manually by a user or automatically by measuring speaker characteristics of the connected headphone 3.

Figure 5:
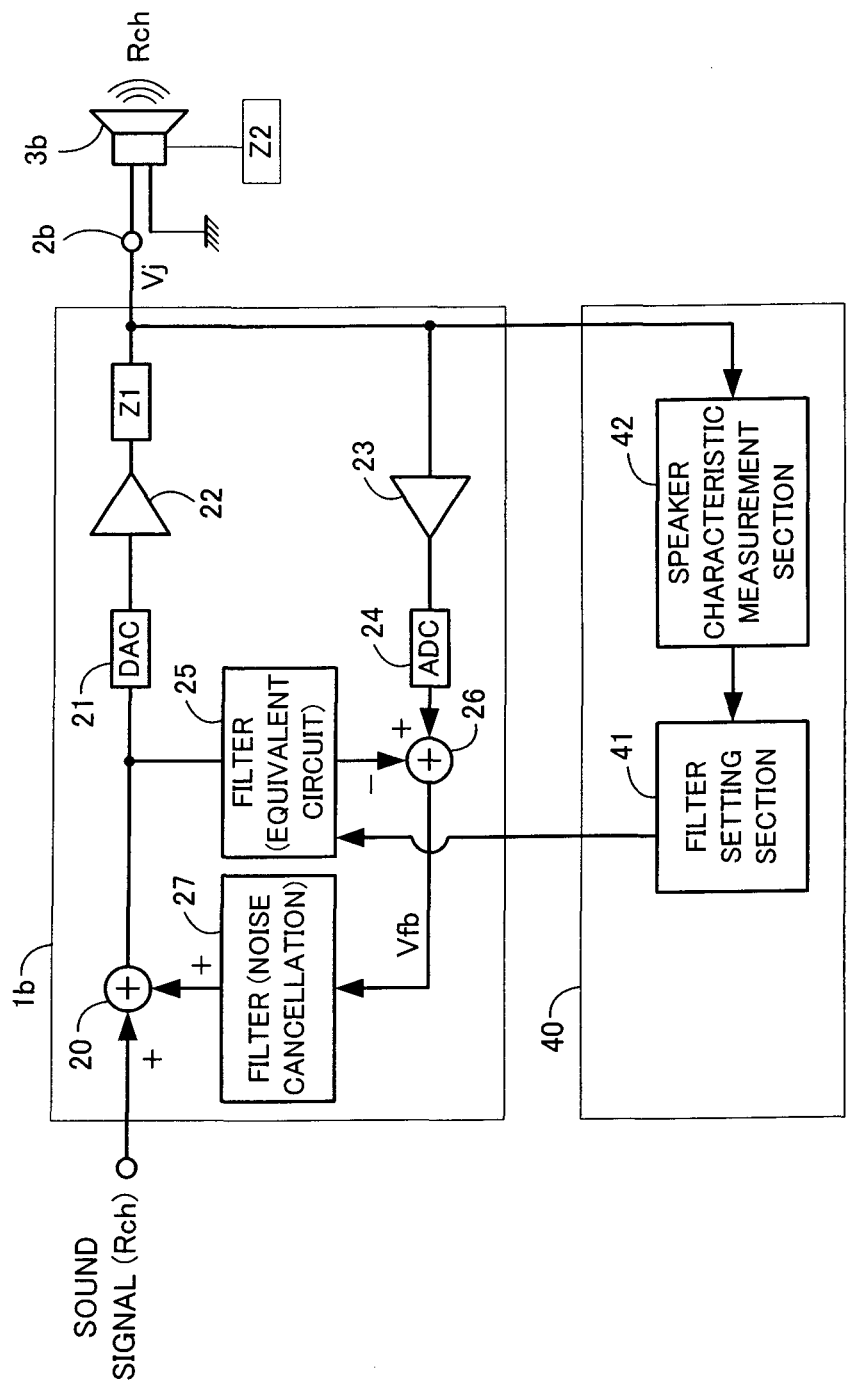
FIG. 5 is a block diagram showing an example construction of the third embodiment of the sound signal processing section equipped with an equivalent circuit setting section.

FIG. 5 is a block diagram showing an example construction of the third embodiment of the sound signal processing section 1b equipped with an equivalent circuit setting section 40 for automatically adjusting the parameters of the filter 25. The equivalent circuit setting section 40, which functions, for example, once the audio apparatus detects connection thereto of a headphone or upon powering-on of the audio apparatus, includes a speaker characteristic measurement section 42 and a filter setting section 41. When the audio apparatus has detected connection thereto of a headphone or upon powering-on of the audio apparatus, for example, the audio apparatus inputs, as a sound signal, a test signal, such as a sine wave signal, to the sound signal processing section 1b while changing the frequency of the signal, to test-drive the speaker 3b of the connected headphone 3. Then, the speaker characteristic measurement section 42 measures a terminal voltage Vj of the speaker 3b driven by the test signal to thereby measure characteristics of the speaker 3b and identify a load impedance Z2 of the speaker 3b. The filter setting section 41 determines various parameters defining the transfer function of the filter 25 on the basis of the load impedance Z2 of the speaker 3b identified by the speaker characteristic measurement section 42. The equivalent circuit setting section 40 sets the thus-determined various parameters into the filter 25 and thereby sets the equivalent circuit including the impedance Z2 of the speaker 3b.

By the provision of such an equivalent circuit setting section 40, the third embodiment of the sound signal processing section 1b allows any desired headphone 3 to be connected to the audio apparatus and can effectively remove ambient noise around the speaker 3b, with the result that the audio apparatus can achieve an even enhanced convenience.

In the case where the parameter adjustment is to be made manually, on the other hand, optimal parameters are prestored for each type of headphone 3 in a memory or the like, so that parameters corresponding to a type of headphone 3 selected by manual operation of the user may be read out from among the prestored parameters and set into the filter 25. In this case, however, headphones 3 of which ambient noise can be appropriately removed are limited only to the types prestored in the memory or the like.

Similarly to the first and second embodiments, the third embodiment can not only avoid cost increase due to provision of a microphone but also effectively remove ambient noise sound even where the headphone is of a small size. Further, the interface 2 for connecting the headphones 3 to the sound signal output section of the audio apparatus can comprise a conventional three-terminal interface.

[Fourth Embodiment of the Sound Signal Processing Section]

The following describe a fourth embodiment of the sound signal processing section 1b. In the above-described third embodiment, the entire equivalent circuit including the speaker 3b comprises a digital filter implemented, for example, by a DSP. However, if the D/A converter 21 and the A/D converter 24 are of a low sampling frequency, errors may easily occur due to sampling delays, and thus, noise cancellation or removal performance may decline. Therefore, the fourth embodiment of the sound signal processing section 1b is constructed to minimize such errors by a combined use of analog and digital filters.

Figure 6:
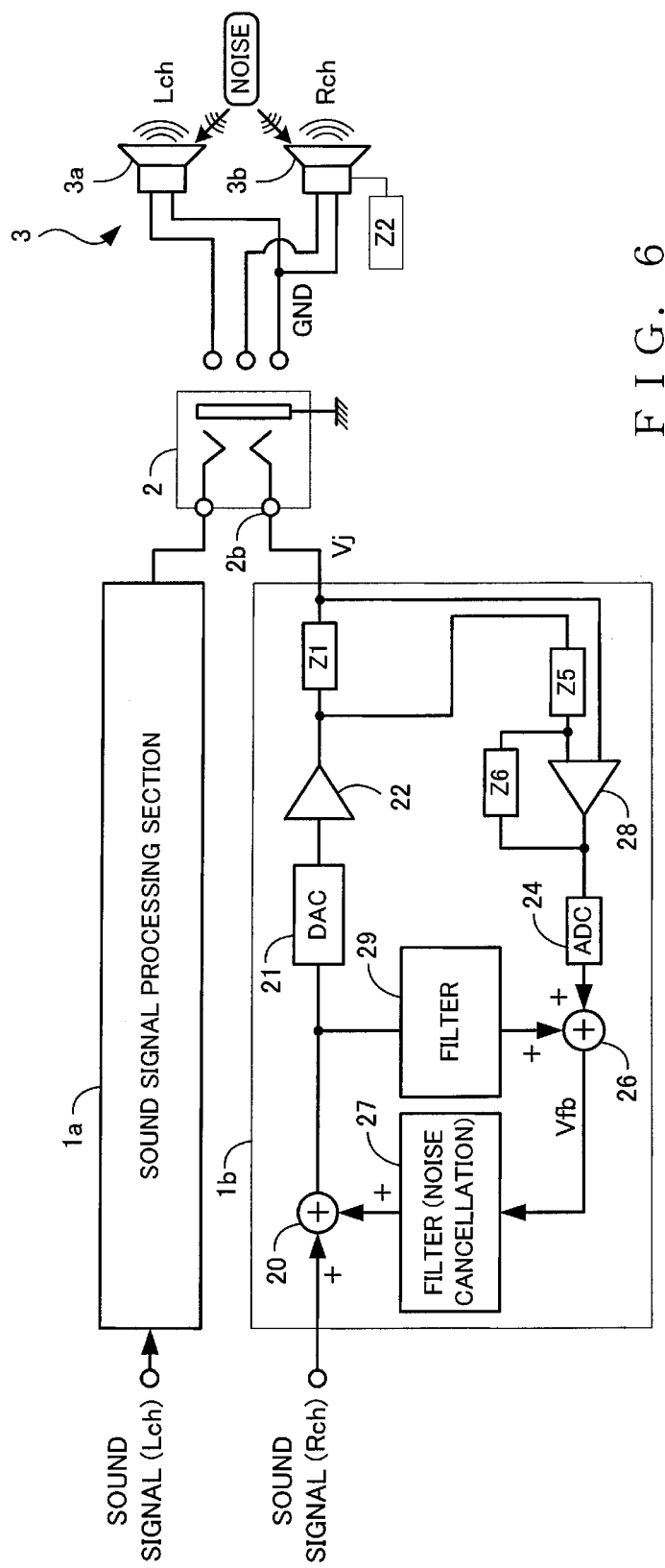
FIG. 6 is a block diagram showing a fourth embodiment of the sound signal processing section.

FIG. 6 is a block diagram showing the fourth embodiment of the sound signal processing section 1b. As shown, the sound signal processing section 1b includes adders 20 and 26, a D/A converter 21, amplifiers 22 and 28, predetermined impedances Z1, Z5 and Z6, an A/D converter 24, and digital filters 27 and 29. Each sound signal input to the sound signal processing section 1b is a digital sound signal.

In the fourth embodiment of the sound signal processing section 1b of FIG. 6, an input digital sound signal is converted to an analog signal by the D/A converter 21 and then amplified by the amplifier 22. The sound signal thus amplified by the amplifier 22 is output through the predetermined output impedance Z1 to thereby drive the speaker 3b.

Further, in the fourth embodiment of the sound signal processing section 1b of FIG. 6, part of the equivalent circuit including the impedance Z2 of the speaker 3b comprises an analog filter that comprises the impedances Z5 and Z6 and differential amplifier 28 as in the above-described second embodiment, and the remaining part of the equivalent circuit comprises the digital filter 29. Namely, a noise component, which cannot be canceled by the analog filter because the circuit comprising the compensating impedances Z5 and Z6 and differential amplifier 28 alone cannot be completely matched to the impedances Z1 and Z2, is canceled using the digital filter 29, so that a back electromotive force Vfb due to ambient noise sound around the speaker 3b is detected as a noise signal.

The noise signal Vfb is input to the filter 27, which in turn generates a noise cancellation signal. The adder 20 adds the noise cancellation signal to the input sound signal, to thereby generate a sound signal having the ambient noise around the speaker 3b removed therefrom. As a result, reproductive sound output is made from the speaker 3b in such a manner as to remove the ambient noise sound.

Namely, with the fourth embodiment, where the equivalent circuit including the impedance Z2 of the speaker 3b comprises a combination of the analog filter, comprising the impedances Z5 and Z6 and differential amplifier 28, and the digital filter 29, it is possible to minimize errors that would occur due to sampling delays of the D/A converter 21 and A/D converter 24 and thus detect, with high accuracy, the back electromotive force Vfb due to ambient noise sound around the speaker 3b.

Further, even where a headphone 3 of a different type has been connected to the interface 2, the fourth embodiment can relatively easily implement the equivalent circuit, appropriately matched to the impedance Z2 of the speaker 3b, by adjusting various parameters defining the transfer function of the filter 25.

Figure 7:
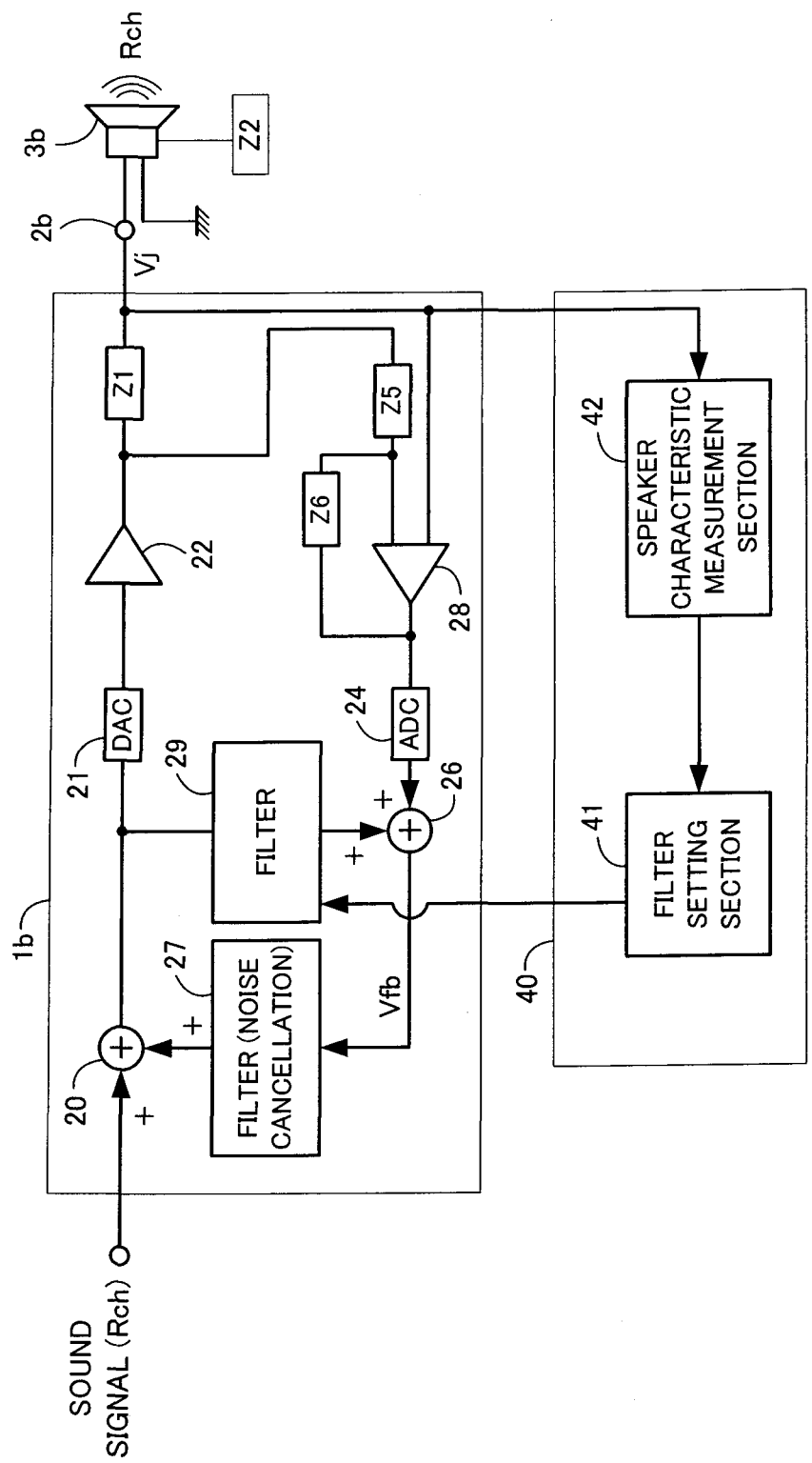
FIG. 7 is a block diagram showing an example construction of the fourth embodiment of the sound signal processing section equipped with an equivalent circuit setting section.

FIG. 7 is a block diagram showing an example construction of the fourth embodiment of the sound signal processing section 1b equipped with an equivalent circuit setting section 40 for automatically adjusting the parameters of the filter 29. As in the third embodiment, the equivalent circuit setting section 40 includes a filter setting section 41 and a speaker characteristic measurement section 42. When the audio apparatus has detected connection thereto of a headphone or upon powering-on of the audio apparatus, for example, the speaker characteristic measurement section 42 measures a terminal voltage Vj of the speaker 3b, driven by a test signal, to thereby measure characteristics of the speaker 3b and identify a load impedance Z2 of the speaker 3b. The filter setting section 41 determines various parameters defining the transfer function of the filter 25 on the basis of the load impedance Z2 of the speaker 3b identified by the speaker characteristic measurement section 42, so that the thus-determined various parameters are set into the filter 29. The fourth embodiment of the sound signal processing section 1b too allows any desired headphone 3 to be connected to the audio apparatus and can effectively remove ambient noise. Further, in the same manner stated above in relation to the third embodiment, the fourth embodiment also permits manual adjustment of the parameters of the filter 29.

Further, similarly to the first and second embodiments, the fourth embodiment can eliminate a need for a microphone that was required in the conventionally-known counterpart for removing ambient noise. Therefore, the fourth embodiment can not only avoid cost increase due to provision of the microphone but also effectively remove ambient noise sound even where the headphone is of a small size. Further, the interface 2 for connecting the headphone 3 to the audio apparatus can be a conventional three-terminal interface.

The following describe several examples (application examples) using the above-described inventive technique for detecting a back electromotive force Vfb produced in the speaker.

APPLICATION EXAMPLE 1

Figure 8:
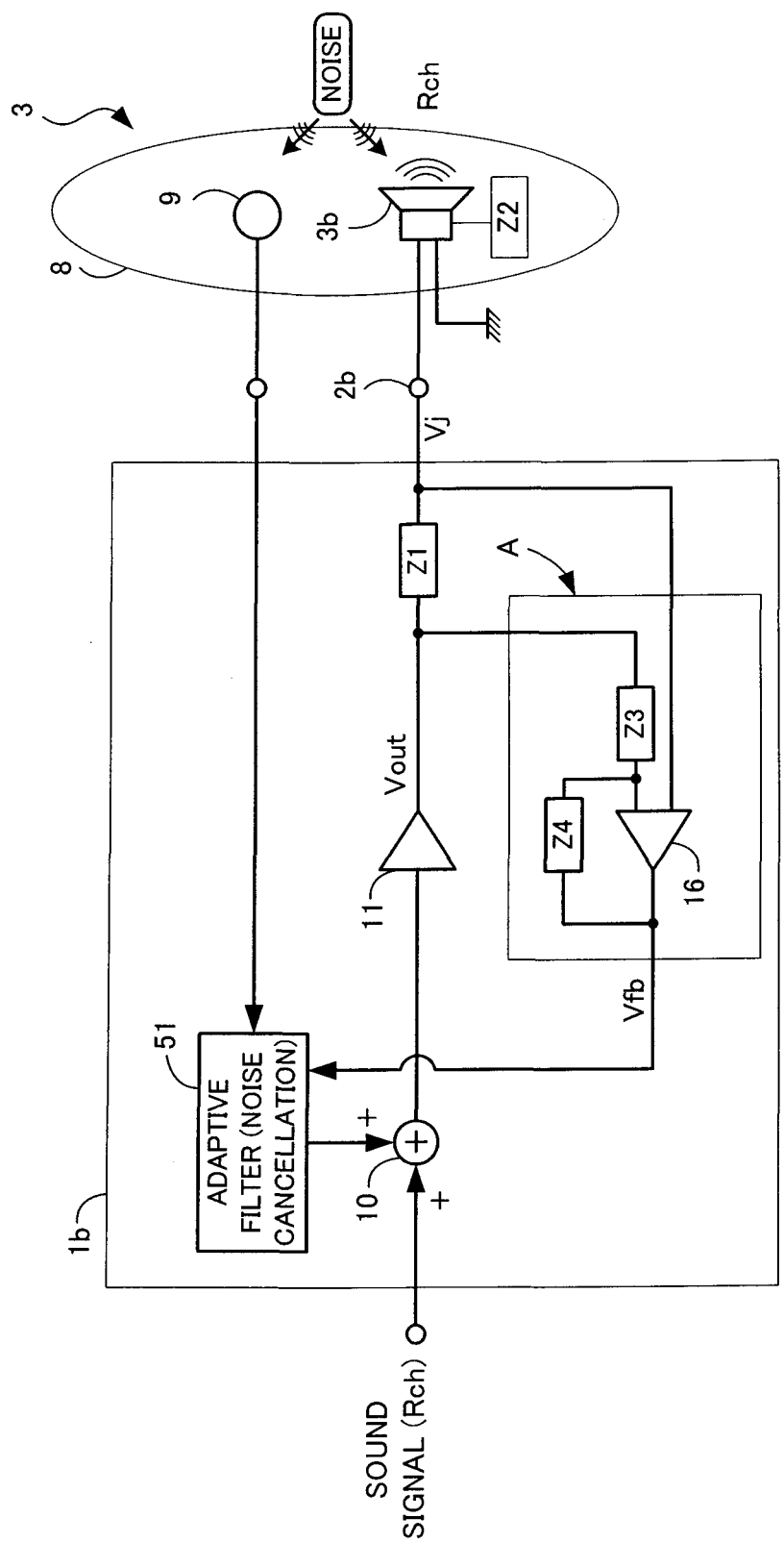
FIG. 8 is a block diagram showing application example 1 of a technique for detecting a back electromotive force of a speaker.

FIG. 8 is a block diagram showing application example 1 applied to the sound signal processing section 1b. As shown, this sound signal processing section 1b is constructed for connection with the headphone 3 that includes, in a headphone casing 8 for attachment to an ear of the user, the speaker 3b and a microphone 9 for detecting ambient noise sound. Therefore, unlike in the above-described embodiments, a conventional three-terminal interface cannot be used as the interface 2 for connecting the headphone 3 to the audio apparatus.

Further, in the sound signal processing section 1b of FIG. 8, an adaptive filter (ADF) 51 generates a noise cancellation signal on the basis of a noise signal detected by the microphone 9. The adaptive filter 51 is a filter that self-adapts its transfer function to an optimal one by changing its characteristics. The adder 10 adds the noise cancellation signal, output from the adaptive filter 51, to the sound signal by the adder 10, to generate a sound signal having ambient noise of the speaker 3b removed therefrom. As a result, reproductive sound output is made from the speaker 3b in such a manner as to remove the ambient noise sound.

Further, in this application example 1, a back electromotive force Vfb of the speaker 3b is detected, on the basis of which it is determined whether or not the ambient noise has been canceled. Namely, as in the second embodiment, the equivalent circuit of the speaker 3b as viewed from the amplifier 11 comprises an analog filter comprising impedances Z3 and Z4 and a differential amplifier 16, and the impedances Z3 and Z4 are set to establish relationship of "Z3/Z4=Z1/Z2". In this way, the back electromotive force Vfb due to the ambient noise sound of the speaker 3b can be obtained as an output of the differential amplifier 16. Namely, the output of the differential amplifier 16 serves as a signal indicating whether or not the ambient noise of the speaker 3b has been appropriately canceled by the noise cancellation signal generated by the adaptive filter 51. Also, application example 1 of FIG. 8 is constructed to allow the noise cancellation signal of an optimal waveform to be added to the input sound signal by changing the characteristics of the adaptive filter 51. Although such an adaptive filter 51 may be any desired filter, the adaptive filter 51 can be simplified in construction if a general-purpose filter is used as the adaptive filter 51 such that only the gain of the filter has to be adjusted with the back electromotive force Vfb. Whereas a filter section A in the example of FIG. 8 is shown as similar in circuit construction to the corresponding section of the second embodiment, the present invention is not so limited and may be similar in circuit construction to the corresponding section of the first embodiment, third embodiment or fourth embodiment.

As set forth above, application example 1 uses the back electromotive force Vfb of the speaker 3b for changing the characteristics of the adaptive filter 51. As a result, application example 1 allows a stable control system to be constructed relatively simply.

APPLICATION EXAMPLE 2

Figure 9:
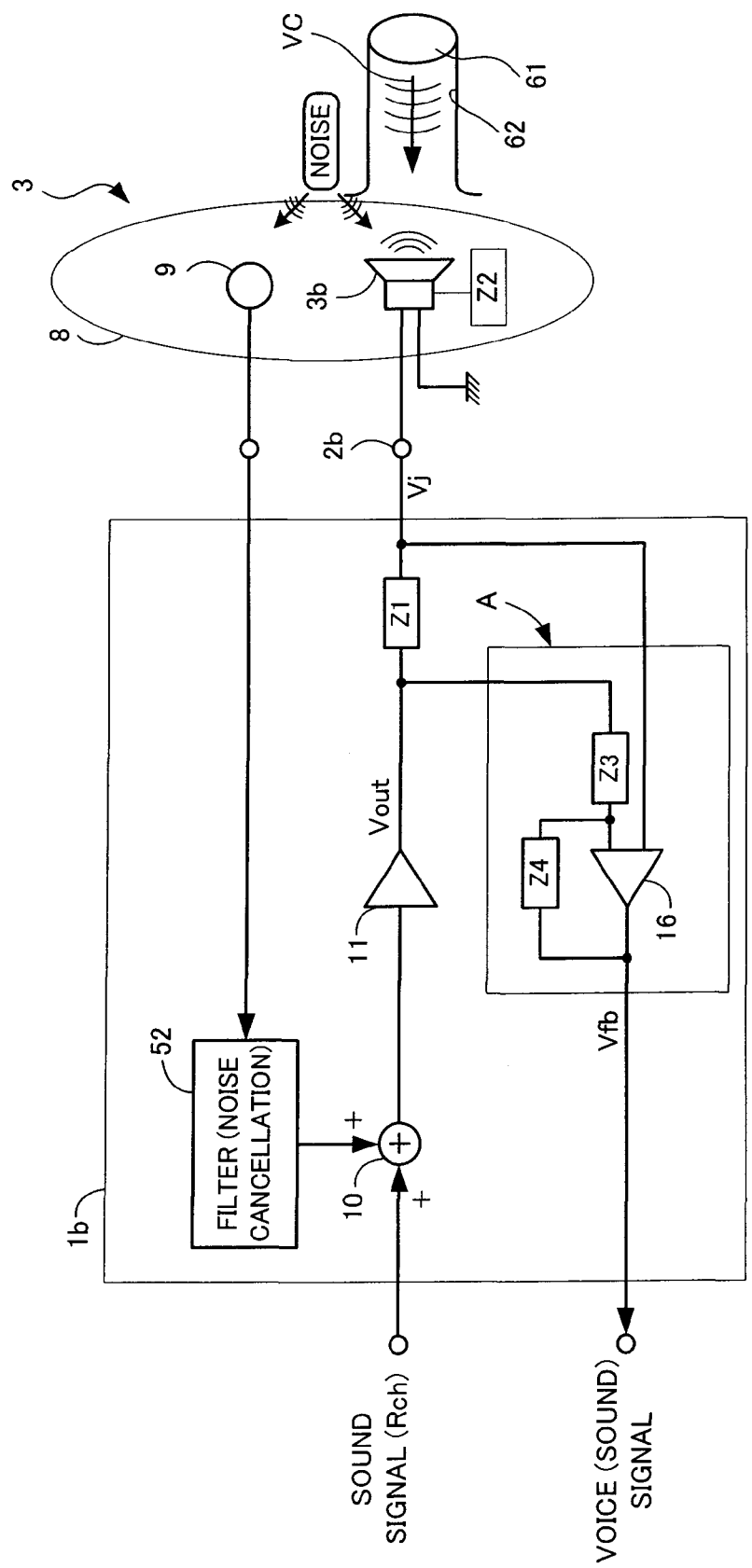
FIG. 9 is a block diagram showing application example 2 of the technique for detecting the back electromotive force of the speaker.

FIG. 9 is a block diagram showing application example 2 applied to the sound signal processing section 1b. In this application example 2, sound of vibration VC, produced in the ear drum 61 or ear canal 62 of the user in response to voice utterance by the user wearing the headphone 3, is picked up by the speaker 3b and output as a sound signal. In this case, the sound of vibration VC, produced in the ear drum or ear canal of the user in response to voice utterance by the user, is weak, and thus, it is difficult to extract only the sound of vibration VC if there is noise sound around the speaker 3b.

Thus, the sound signal processing section 1b is constructed for connection with the headphone 3 that includes, as shown in FIG. 9, the speaker 3b and the microphone 9 for detecting ambient noise sound. As in application example 1 above, a filter 52 generates a noise cancellation signal on the basis of a noise signal detected by the microphone 9, and the adder 10 adds the noise cancellation signal, output from the filter 52, to the sound signal by the adder 10, to generate a sound signal having ambient noise of the speaker 3b removed therefrom. As a result, reproductive sound output is made from the speaker 3b in such a manner as to remove the ambient noise sound.

Further, in this application example 2, a back electromotive force Vfb of the speaker 3b is detected, so that a sound signal corresponding to the sound of vibration VC, produced in the ear drum or ear canal of the user, is output. Namely, as in the second embodiment, the equivalent circuit of the speaker 3b as viewed from an amplifier 11 comprises an analog filter comprising impedances Z3 and Z4 and a differential amplifier 16, and the impedances Z3 and Z4 are set to establish relationship of "Z3/Z4=Z1/Z2". Because the ambient noise sound of the speaker 3b is canceled on the basis of the noise signal detected by the microphone 9, the back electromotive force Vfb of the speaker 3b obtained as an output of the differential amplifier 16 consists only of a back electromotive force produced by the sound of vibration VC produced in the ear drum or ear canal of the user, and this back electromotive force is output as a voice (sound) signal. Whereas the filter section A in the example of FIG. 9 is shown as similar in circuit construction to the corresponding section of the second embodiment, the present invention is not so limited and may be similar in circuit construction to the corresponding section of the first embodiment, third embodiment or fourth embodiment.

Because application example 2 is constructed to cancel the ambient noise of the speaker 3b by use of the microphone 9, it can detect, with high accuracy, the sound signal corresponding to the sound of vibration VC produced in the ear drum or ear canal of the user, by detecting the back electromotive force Vfb of the speaker 3b. Thus, with application example 2, a microphone function for picking up a voice uttered by the user can be advantageously implemented only with a headset constructing the headphone 3.

APPLICATION EXAMPLE 3

Figure 10:
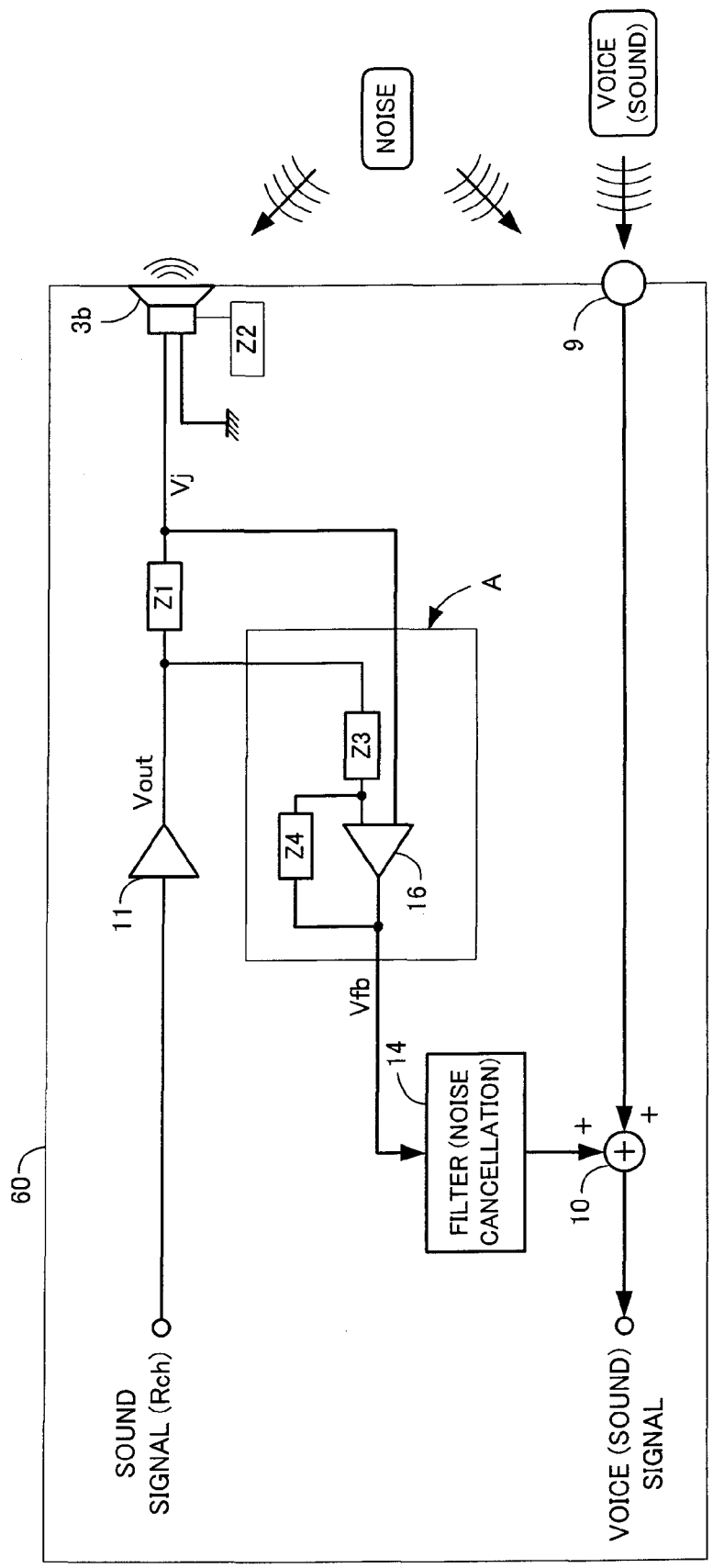
FIG. 10 is a block diagram showing application example 3 of the technique for detecting the back electromotive force of the speaker.

Application example 3 is applied to a construction which includes, for example, the speaker 3b for audibly output a sound and the microphone 9 for picking up a voice (sound) to output a voice (sound) signal, and it outputs a clear sound signal by removing ambient noise sound input to the microphone 9. FIG. 10 is a block diagram showing such a construction where the speaker 3b and the microphone 9 are provided, for example, in a portable terminal apparatus 60, such as a portable telephone or portable game machine.

As shown in FIG. 10, the portable terminal apparatus 60 inputs a sound signal of a voice or the like to the amplifier 11 for amplification of the sound signal. The sound signal Vout amplified by the amplifier 11 is output through the predetermined output impedance Z1 to drive the speaker 3b having the load impedance Z2.

Application example 3 detects a back electromotive force Vfb of the speaker 3b to detect an external noise signal input to the portable terminal apparatus 60. Namely, as in the second embodiment, the equivalent circuit of the speaker 3b as viewed from an amplifier 11 comprises an analog filter comprising impedances Z3 and Z4 and a differential amplifier 16, and the impedances Z3 and Z4 are set to establish relationship of "Z3/Z4=Z1/Z2". Thus, the back electromotive force Vfb due to the external noise signal input acting on the portable terminal apparatus 60 can be obtained as an output of the differential amplifier 16. The back electromotive force Vfb is input to the filter 14 which in turn generates a noise cancellation signal of an opposite phase from the noise signal. The adder 10 adds the noise cancellation signal to the sound signal, detected by the microphone 9, to thereby remove the noise signal input to the microphone 9, so that a clear sound signal is output from the adder 10. Whereas the filter section A in the example of FIG. 10 is shown as similar in circuit construction to the corresponding section of the second embodiment, the present invention is not so limited and may be similar in circuit construction to the corresponding section of the first embodiment, third embodiment or fourth embodiment.

As set forth above, application example 3 is constructed to detect the back electromotive force Vfb, generated by the speaker 3b, to remove the noise signal from the sound signal input to the microphone 9, and thus, a clear sound signal can be output. In this way, even where the portable terminal apparatus 60 is used in a strong wind environment, application example 3 allows a clear sound signal, having wind noise etc. removed therefrom, to be transmitted to a communication party. Further, even when an impact or the like has acted on a casing of the portable terminal apparatus 60, application example 3 can output a sound signal having an impact sound etc. removed therefrom.

Whereas application example 3 has been described above as applied to the portable terminal apparatus 60, the present invention is not so limited. For example, the speaker 3b and the microphone 9 may be provided in separate casings. Even in such a case, a clear sound signal having ambient noise removed from a sound signal input to the microphone 9 can be output as long as the speaker 3b and the microphone 9 are in a same space.

(Modification)

Whereas the present invention has been described above in relation to several embodiments and application examples, it is not limited to such embodiments and application examples. For example, although the third and fourth embodiments have been described above in relation to the case where the equivalent circuit setting section 40 is provided and the characteristics of the digital filter are changed in accordance with the headphone 3 connected to the interface 2, a technique similar to the technique of the third and fourth embodiments may also be applied to the first and second embodiments where the equivalent circuit comprises an analog filter.

The A/D converter and D/A converter employed in the above-described embodiments and application examples may be of a parallel multi-bit input/output type. Alternatively, the A/D converter and D/A converter may perform the A/D conversion and D/A conversion on the basis of $\Delta\Sigma$ modulation; in this case, the filtering process may be performed directly on a $\Delta\Sigma$-modulated signal.

The present application is based on, and claims priority to, Japanese Patent Application No. 2009-156589 filed on Jul. 1, 2009. The disclosure of the priority application, in its entirety, including the drawings, claims, and the specification thereof, is incorporated herein by reference.

What is claimed is:

1. An ambient noise removal device for a headphone speaker, the ambient noise removal device comprising:
an interface that connects the headphone speaker;
a sound signal output section that connects to the headphone speaker via the interface and outputs a sound signal to thereby drive the headphone speaker;
a noise detection section, including an equivalent circuit of the headphone speaker, that detects an electromotive force produced in the headphone speaker by ambient noise;
an equivalent circuit setting section that sets the equivalent circuit depending on the headphone speaker connected to the interface; and
a noise cancellation section that generates, on the basis of the electromotive force, a signal of an opposite phase from the ambient noise and adds the generated signal to the sound signal to thereby cancel the ambient noise,
wherein the noise detection section detects the electromotive force, produced by the ambient noise, by obtaining a difference between a first electromotive force produced in the headphone speaker in response to the sound signal output section driving the headphone speaker on the basis of the sound signal and a second electromotive force produced in the equivalent circuit by inputting the sound signal to the equivalent circuit.

2. The ambient noise removal device as claimed in claim 1, wherein at least part of the equivalent circuit comprises a digital filter.

3. The ambient noise removal device as claimed in claim 1, wherein at least part of the equivalent circuit comprises an analog filter.

4. The ambient noise removal device as claimed in claim 1, further comprising:
- a speaker characteristic measurement section that measures a characteristic of the headphone speaker connected to the interface,
- wherein the equivalent circuit setting section sets the equivalent circuit on the basis of a result of characteristic measurement by the speaker characteristic measurement section.

* * * * *